(12) United States Patent
Yamamoto

(10) Patent No.: US 9,086,831 B2
(45) Date of Patent: Jul. 21, 2015

(54) INFORMATION PROCESSING SYSTEM COMPRISING ONE OR MORE APPARATUSES WHICH MANAGE JOB INFORMATION OF A JOB

(71) Applicant: CANON KABUSHIKI KAISHA, Tokyo (JP)

(72) Inventor: Hiroyuki Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/341,206

(22) Filed: Jul. 25, 2014

(65) Prior Publication Data
US 2015/0043030 A1    Feb. 12, 2015

(30) Foreign Application Priority Data

Aug. 12, 2013  (JP) .................................. 2013-167847

(51) Int. Cl.
*G06F 3/12*    (2006.01)
(52) U.S. Cl.
CPC ............ *G06F 3/1268* (2013.01); *G06F 3/1285* (2013.01)

(58) Field of Classification Search
USPC .................................................. 358/1.1–3.29
See application file for complete search history.

(56) References Cited

U.S. PATENT DOCUMENTS

| 8,074,222 B2 * | 12/2011 | Hirai ............................. 718/102 |
| 2010/0229086 A1 * | 9/2010 | Howell et al. ................. 715/273 |

FOREIGN PATENT DOCUMENTS

JP    2008-210164 A    9/2008

* cited by examiner

*Primary Examiner* — Marcellus Augustin
(74) *Attorney, Agent, or Firm* — Fitzpatrick, Cella, Harper & Scinto

(57) ABSTRACT

In a case where an execution request for a job to be executed by an external device is received, job information of the job is registered in a first database. A second database is searched for job information of a job for the external device which executes the job. Based on the found job information, predetermined processing is executed on a job corresponding to the job information. In a case where job information is searched for in accordance with registration of a job and at least the job information is not found, predetermined processing is executed, based on the registered job information held in an information processing apparatus, on a job corresponding to the job information.

23 Claims, 14 Drawing Sheets

FIG. 3

| JOB ID | PRINTER ID | JOB ACCEPTANCE DATE/TIME | JOB STATUS | JOB PRIORITY |
|---|---|---|---|---|
| 00001 | PRINTER_1 | 2013/05/02 13:00:00 | DONE | NORMAL |
| 00002 | PRINTER_7 | 2013/05/02 13:00:42 | PRINTING | NORMAL |
| 00003 | PRINTER_1 | 2013/05/02 13:45:10 | CANCELED | HIGH |
| 00004 | PRINTER_4 | 2013/05/02 16:30:09 | SENDING | NORMAL |
| 00005 | PRINTER_4 | 2013/05/03 07:07:07 | QUEUED | NORMAL |
| 00006 | PRINTER_2 | 2013/05/03 10:55:55 | ERROR | NORMAL |

INFORMATION PROCESSING SYSTEM COMPRISING ONE OR MORE APPARATUSES WHICH MANAGE JOB INFORMATION OF A JOB

BACKGROUND OF THE INVENTION

1. Field of the Invention

The present invention relates to an information processing technique of managing job information of a job to be executed by an external device.

2. Description of the Related Art

Recently, a business which opens a service to the public as a cloud service on the Internet has been developed. A print server is also required to provide a function as a print service on the Internet, that is, a cloud print service. This service releases a user from a large limitation that he or she cannot perform printing without connecting a terminal such as a personal computer (PC) to a printer and installing a specific printer driver to the terminal. In addition, the service provider can readily add server resources and improve design specifications in accordance with the load, that is, there are various merits for development.

A method using a database (to be referred to as a DB hereinafter) is available as a method of implementing a print job queue in a cloud print service like this. A print job having the highest priority in a desired printer can be decided by registering, in the DB, print jobs for different printers registered in the cloud print service together with information about, for example, the input date/time of each print job, and acquiring only a print job meeting appropriate conditions by using a database manipulation language such as SQL. Thus, print job queues of very many printers can be implemented by a single DB. This method has the merit that even an inexpensive printer incapable of implementing a print job queue by the hardware resources of the main body can implement a print job queue. In addition, many techniques for load balancing such as replication have been proposed for the DB. Since this can relatively easily enlarge the service scale, replication is one print job queue implementing method in the cloud print service.

Unidirectional replication is a technique for balancing the load on the DB. The unidirectional replication has an arrangement including a master DB for accepting a data update process, and one or more slave DBs for mirroring the state of the master DB. When compared to a DB configuration including only one DB, this arrangement can perform backup when a trouble occurs, and, in addition to that, can balance the access load on the master DB by performing access of reference only without any data update on the slave DB. The unidirectional replication is further classified into synchronous and asynchronous unidirectional replications in accordance with the data update process for the master DB, and the mirroring completion timing of the slave DB.

The synchronous replication ensures mirroring completion of the slave DB when data update to the master DB is complete, but has the demerit that the response speed of the data update process for the master DB decreases. In the asynchronous replication, the data update process for the master DB and mirroring for the slave DB are asynchronous, so the response speed of the data update process for the master DB is high. On the other hand, since a delay occurs in the completion of mirroring for the slave DB, a time during which data just registered in the master DB cannot be acquired from the slave DB is produced. Japanese Patent Laid-Open No. 2008-210164 has disclosed a technique by which a job is backed up in preparation for down of the DB, and, even when no data can be acquired from the DB, the job is executed without any interruption.

The method disclosed in Japanese Patent Laid-Open No. 2008-210164 is based on a recovery process when the DB is down. However, a job stored as backup data is not referred to unless the DB is down. In addition, the processing overhead is large because both a job transmission process and the backup process are performed.

SUMMARY OF THE INVENTION

The present invention provides an information processing technique capable of properly processing a job while suppressing the processing load for job processing, in a system which manages jobs by using a plurality of memories.

To achieve the above-mentioned object, an information processing apparatus according to the present invention has the following arrangement. That is, an information processing apparatus which manages job information of a job to be executed by an external device by registering the job information in a first database, and further asynchronously registering the job information in a second database, comprising: a registration unit configured to register, in a case where receiving an execution request for a job to be executed by the external apparatus, job information of the job in the first database; a search unit configured to search the second database for job information of a job for the external device which executes the job; and an execution unit configured to execute, based on job information found by the search unit, predetermined processing on a job corresponding to the job information, wherein in a case where the search unit searches for job information in accordance with registration of a job performed by the registration unit and at least the job information is not found, the execution unit executes, based on the job information registered by the registration unit and held by the information processing apparatus, the predetermined processing on a job corresponding to the job information.

The present invention can provide an information processing technique capable of properly processing a job while suppressing the processing load for job processing, in a system which manages jobs by using a memory.

Further features of the present invention will become apparent from the following description of exemplary embodiments with reference to the attached drawings.

BRIEF DESCRIPTION OF THE DRAWINGS

FIG. 3 is a view showing a job table holding print job information;

DESCRIPTION OF THE EMBODIMENTS

Embodiments of the present invention will be explained in detail below with reference to the accompanying drawings. Note that the following embodiments do not limit the present invention according to the scope of claims, and not all combinations of features explained in the embodiments are essential for the means for solving the present invention.

First Embodiment

An embodiment of the present invention will be explained by taking a print system in a cloud print service as an example. In a print job management service of the print system in the cloud print service, when a print job is received from a client terminal, print job information is registered in a master DB (first database) having an asynchronous replication arrangement, and the print job information is also registered in a slave DB (second database). In addition, all unexecuted print jobs for a designated printer are acquired from the slave DB, and a highest-priority job (a print job having the highest priority) to be executed by the printer is decided and transmitted to the printer, thereby implementing a print job queue.

In the following description, a method of correctly deciding a print job having the highest priority and transmitting the job to a printer even when print job information cannot be acquired from the slave DB immediately after the information is registered in the master DB in the system which manages jobs across a plurality of databases by giving redundancy to the jobs as described above will be explained.

Figure 1:
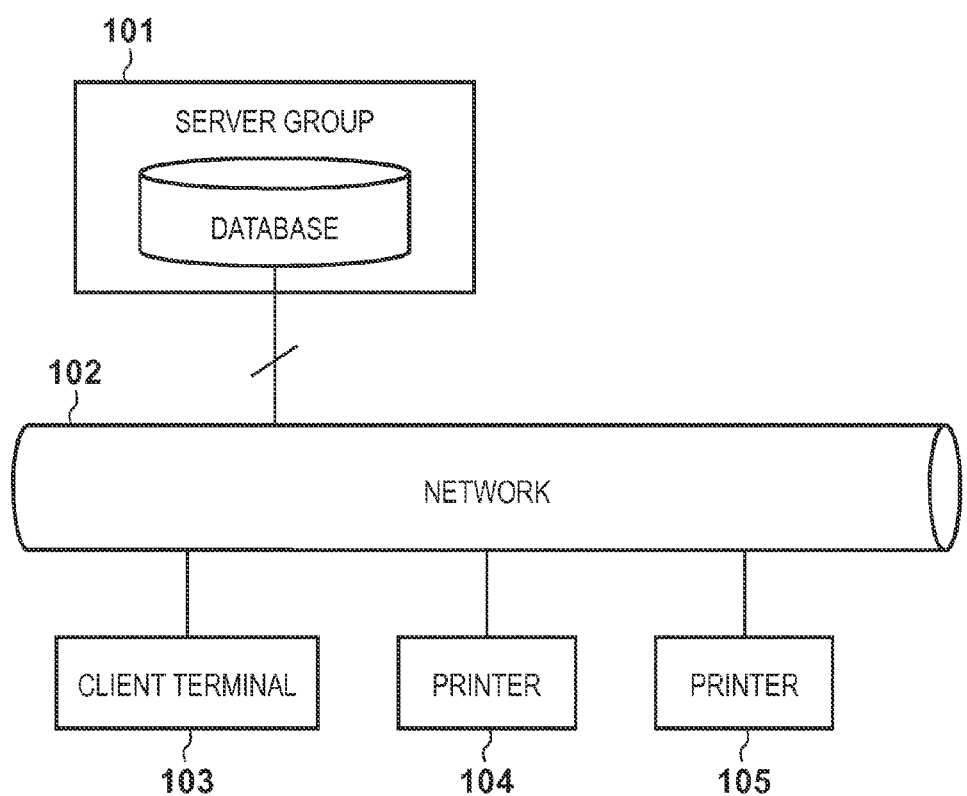
FIG. 1 is a view showing the overall configuration of a print system.

FIG. 1 is a view showing the overall configuration of the print system.

Referring to FIG. 1, a server group 101, a client terminal 103, and printers 104 and 105 as printing apparatuses are connected across a network 102. The server group 101 is a server group for implementing the print system. When accepting a print request from the client terminal 103, the server group 101 registers print job information in an internal database of the server group 101. Also, the server group 101 acquires print job information from the database, generates print data, and transmits the data to the printer 104 or 105. The client terminal 103 can transmit, to the server group 101, a print request for document data or image data saved in the client terminal 103, or document data or image data obtainable from a Web service or the like, and print the data by the printer 104 or 105. The printers 104 and 105 acquire print data of document data or image data as a target of the print request from the client terminal 103, and print the data. The network 102 is, for example, a so-called communication network implemented by the Internet.

<System Configuration>

Figure 2:
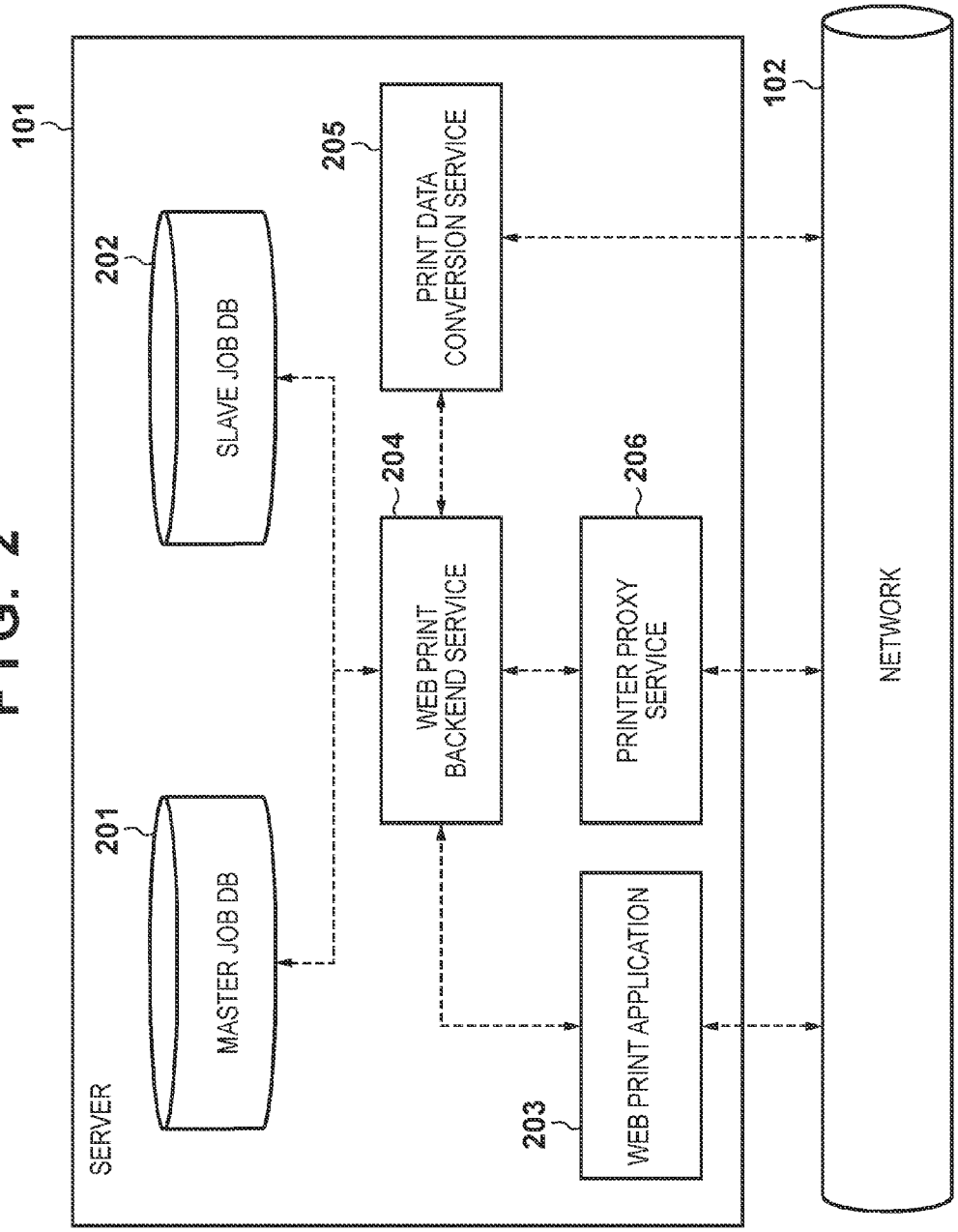
FIG. 2 is a view showing the system configuration of the print system.

FIG. 2 is a system configuration view of the print system.

A master job DB 201 and slave job DB 202 are asynchronous replication databases. When a process including the update of data contents, for example, the registration (insertion), update, or delete of data is executed on the master job DB 201, the master job DB 201 transmits update information of the data contents to the slave job DB 202. The slave job DB 202 reflects the received update information on data contents in its own database.

A Web print application 203 accepts a print request from the client terminal 103, generates a print job, and transmits the print job to a Web print backend service 204.

The Web print backend service 204 receives a print job from the Web print application 203, and registers print job information of the print job in the master job DB 201. Also, the Web print backend service 204 acquires print job information from the slave job DB 202, and transmits a print data generation request to a print data conversion service 205. In addition, when receiving a print data generation completion notification from the print data conversion service 205, the Web print backend service 204 transmits a printing start request to the printer 104 or 105 via a printer proxy service 206. Furthermore, when receiving a notification such as a printing completion request from the printer 104 or 105 via the printer proxy service 206, the Web print backend service 204 deletes the corresponding print job information from the master job DB 201.

When receiving the print data generation request from the Web print backend service 204, the print data conversion service 205 generates print data from the print job. The printer proxy service 206 communicates with the printer 104 or 105 in accordance with the request from the Web print backend service 204. Also, when receiving a notification such as a printing completion request or error notification from the printer 104 or 105, the printer proxy service 206 transmits the notification to the Web print backend service 204.

The Web print application 203, Web print backend service 204, print data conversion service 205, and printer proxy service 206 are independent programs, and can be installed in different information processing apparatuses. These programs are installed in information processing apparatuses (information processing systems) connected to the network, and communicate with each other. These programs can also be installed in the same information processing apparatus.

Note that an example in which the server group 101 includes all services in this system configuration is being explained, but it is also possible to distribute all the services to different servers, or distribute combinations of some of the above various services to different servers.

An information processing apparatus for implementing the server group 101 or client terminal 103 includes standard constituent elements (for example, a CPU, RAM, ROM, hard disk, external storage device, network interface, display, keyboard, and mouse) incorporated into a general-purpose computer. Processes to be executed by the server group 101 and client terminal 103 (for example, processes shown in the flowcharts of FIGS. 4 to 9 (to be described later)) can be implemented by, for example, the CPU incorporated into each apparatus by executing and controlling programs stored in a memory such as the ROM.

<Example of Print Job Queue Implementation Using Databases>

An example of the print job queue implementing method using the databases in the print system will be explained.

A job table 300 shown in FIG. 3 indicates a print job table held in the master job DB 201 and slave job DB 202, and storing print job information of print jobs. A job ID 301 is an ID uniquely allocated to a print job. The job IDs 301 do not have the same value in the job table 300, and each function as a main key for searching for a print job in the job table 300.

A printer ID 302 is an ID uniquely indicating a printer for executing a print job of the corresponding job ID 301. A job acceptance date/time 303 indicates the date/time (date/time information for managing jobs in time series) on which a print job is accepted. For example, the date/time on which the Web print application 203 accepted a print request from the client terminal 103, the date/time on which the Web print backend service 204 received a print job from the Web print application 203, or the date/time on which a print job was registered in the master job DB 201 is designated as the date/time.

A job status 304 indicates the execution state of a print job of the corresponding job ID 301. The execution state includes "DONE" indicating a processed print job, "PRINTING" indicating a print job currently being processed, "CANCELED" indicating a canceled print job, "SENDING" indicating a print job currently being transmitted, "QUEUED" indicating an unprocessed print job, and "ERROR" indicating a print job for which an error has occurred.

A job priority 305 indicates the priority (priority information) of a print job when information other than the job acceptance date/time 303 is used as a condition as an order of executing print jobs in the printers 104 and 105. The priority includes "NORMAL" indicating a normal priority (first priority), and "HIGH" indicating a priority (second priority) higher than the normal priority.

Other data to be managed and held for each print job can be stored in the job table 300. Possible examples are printing setting information, a URL (Unified Resource Locator) indicating a location where document data or image data as a print target is stored, and a user ID uniquely representing a user who has transmitted the corresponding print job to the Web print application 203. However, other items may also exist.

When receiving a print job from the Web print application 203, the Web print backend service 204 registers print job information corresponding to the print job in the job table 300 of the master job DB 201. After that, the Web print backend service 204 searches the slave job DB 202 for an unprocessed print job among print jobs for a printer which executes the registered print job.

When taking the job table 300 as an example, this search process can be implemented by a database manipulation language so described as to search and acquire a list of the job IDs 301 of print jobs each of which has the printer ID 302 matching a predetermined printer ID and has the job status 304 which is "QUEUED" representing "waiting for execution", as the search conditions. This makes it possible to search for only an unprocessed print job for a specific printer from a database in which print jobs in various execution states for a plurality of printers coexist. Also, when a condition "a print job having the oldest job acceptance date/time 303" is further added to the search conditions, it is possible to uniquely specify a print job which is registered first among unprocessed print jobs.

It is also possible to add a condition other than the job acceptance date/time 303 as a condition for deciding a print job having the highest priority. For example, the job priority 305 indicates the priority of a print job indicated by the corresponding job ID. When transmitting a print request from the client terminal 103 to the Web print application 203, the user sets the value of the job priority 305 to "HIGH" and registers the value only when he or she intends to execute the print job prior to other print jobs. When the Web print backend service 204 decides a print job having the highest priority, even if there is a print job found to be older by the job acceptance date/time 303, a print job whose job priority 305 is "HIGH" is preferentially transmitted to a printer.

Note that in this embodiment, the arrangement for uniquely deciding a print job having the highest priority by using the search conditions for the database is explained, but the present invention is not limited to this. For example, the Web print backend service 204 may also acquire all unprocessed print jobs from the slave job DB 202, and decide a print job having the highest priority from these print jobs.

In this embodiment as described above, the master job DB 201 accepts job registration from the Web print backend service 204, and notifies job registration completion. This job is registered in the slave job DB 202, and the Web print backend service 204 reads out the job from the slave job DB 202. The processing load on the DBs can be reduced by thus distributing these processes to the master job DB 201 and slave job DB 202 as job DBs. The above-mentioned processes will be explained in detail below with reference to FIG. 4.

<Printing Process>

Figure 4:
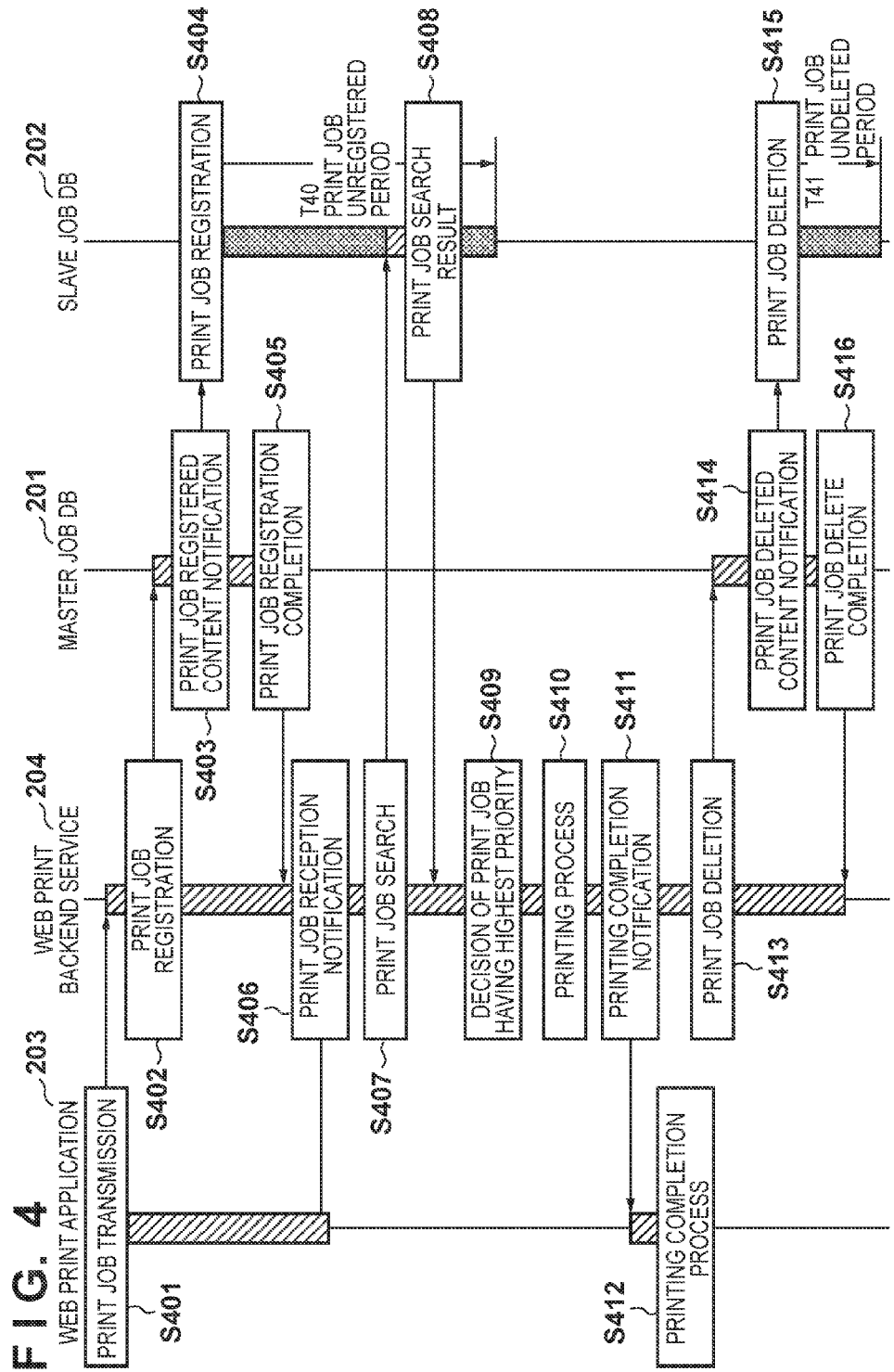
FIG. 4 is a sequence chart showing a printing process in the print system.

FIG. 4 is a sequence chart showing the printing process in the print system.

In step S401, the Web print application 203 having received a print request from the client terminal 103 transmits a generated print job to the Web print backend service 204.

In step S402, the Web print backend service 204 registers the print job received from the Web print application 203 in the master job DB 201.

In step S403, the master job DB 201 notifies the slave job DB 202 of print job information of the registered print job as DB update contents. In step S405, the master job DB 201 notifies the Web print backend service 204 of the completion of print job registration without waiting for the completion of print job registration in the slave job DB 202. As described above, the system of this embodiment is an asynchronous system which does not perform any print job registration synchronizing process between the master job DB 201 and slave job DB 202. This makes it possible to prevent the print job processing from being delayed by synchronization.

In step S404, the slave job DB 202 having received the DB update contents (print job information) from the master job DB 201 in step S403 registers a print job corresponding to this print job information in data contents held in the slave job DB 202. A print job unregistered period T40 until this print job registration process is complete is a period during which this print job cannot be acquired from the slave job DB 202.

In step S406, the Web print backend service 204 notifies the Web print application 203 of the reception of the print job. Subsequently, in step S407, the Web print backend service 204 transmits a job search request to the slave job DB 202 in order to search for all print jobs for a printer which executes the print job received in step S401.

In step S408, the slave job DB 202 having received the job search request from the Web print backend service 204 searches its own database for all print jobs corresponding to the designated printer, and returns the print job search result to the Web print backend service 204.

As described above, the system according to this embodiment is an asynchronous system in which the print job registration processes in the master job DB 201 and slave job DB 202 are not synchronized, and the print job registration completion is notified in step S405. This makes it possible to prevent the print job processing from being delayed by synchronization.

In step S407, however, the Web print backend service 204 searches for print jobs without confirming the registration of the job in the slave job DB 202. If the print job search in step S407 is performed in the print job unregistered period T40, therefore, the print job registered in the master job DB 201 in step S402 does not exist in the slave job DB 202 yet, and hence is not contained in the search result. Accordingly, if no print job for the designated printer is found in the slave job DB 202, "0" is returned as the search result to the Web print backend service 204. On the other hand, if a print job other than the print job registered in step S402 is already registered in the slave job DB 202, the search result is "one or more".

On the other hand, if step S408 is performed after the print job unregistered period T40, the print job registered in the master job DB 201 in step S402 exists in the slave job DB 202 as well, and hence is contained in the search result. Accordingly, the search result is necessarily "one or more".

In step S409, the Web print backend service 204 determines a print job having the highest priority from the print jobs contained in the search result received in step S408. Details of the method of deciding a print job having the highest priority will be explained below. In step S410, the Web print backend service 204 transmits print data formed by the print data conversion service 205 to the printer 104 or 105 via the printer proxy service 206, thereby executing the printing process. Note that details of the printing execution process will be described later with reference to FIG. 5. In step S411, the Web print backend service 204 notifies the Web print application 203 of printing completion.

In step S412, the Web print application 203 performs a printing completion process such as printing completion notification for the client terminal 103 from which the print request is accepted.

In step S413, the Web print backend service 204 transmits, to the master job DB 201, a request for deleting the print job executed in step S410 from the database.

In step S414, the master job DB 201 deletes the delete target print job indicated by the received delete request from the database, and transmits, to the slave job DB 202, a delete notification containing information of the deleted print job as data update contents.

In step S415, the slave job DB 202 deletes the delete target print job indicated by the delete notification received in step S414 from the database. A print job undeleted period T41 until this print job deleting process is complete is a period during which this print job can be acquired from the slave job DB 202.

In step S416, the master job DB 201 transmits a print job delete completion notification to the Web print backend service 204 without waiting for the completion of the process by which the slave job DB 202 deletes the print job from its own database.

Next, details of the printing process in step S410 of FIG. 4 will be explained with reference to FIG. 5.

In step S500, the Web print backend service 204 transmits a print data conversion request to the print data conversion service 205, together with print job information of the print job having the highest priority decided in step S409 of FIG. 4.

In step S501, the print data conversion service 205 generates print data printable by the printer 104 or 105 from the print job information received from the Web print backend service 204 in step S500. Then, the print data conversion service 205 transmits a print data generation completion notification to the Web print backend service 204.

In step S502, the Web print backend service 204 transmits a printing start request to the printer 104 or 105 via the printer proxy service 206.

In step S503, the printer proxy service 206 receives the printing start request transmitted by the Web print backend service 204 in step S502, and transmits a print job notification to the printer 104 or 105.

In step S504, the printer 104 or 105 receives the print job notification from the printer proxy service 206, and transmits a print job information acquisition request to the printer proxy service 206.

In step S505, the printer proxy service 206 receives the print job information acquisition request from the printer 104 or 105, and transmits the print job information to the printer 104 or 105.

In step S506, the printer 104 or 105 acquires access information such as a URL indicating the location where the print data is stored or an access token for accessing the print data from the print job information received from the printer proxy service 206. Then, the printer 104 or 105 transmits, to the print data conversion service 205, a print data acquisition request to which the acquired access information is added.

In step S507, the print data conversion service 205 refers to the received print data acquisition request, and transmits the requested print data to the printer 104 or 105.

In step S508, the printer 104 or 105 executes printing of the received print data. When the printing of the print data is complete, the printer 104 or 105 transmits a printing completion notification to the printer proxy service 206 in step S509.

In step S510, the printer proxy service 206 receives the printing completion notification from the printer 104 or 105, and transmits a printing completion notification to the Web print backend service 204.

Figure 5:
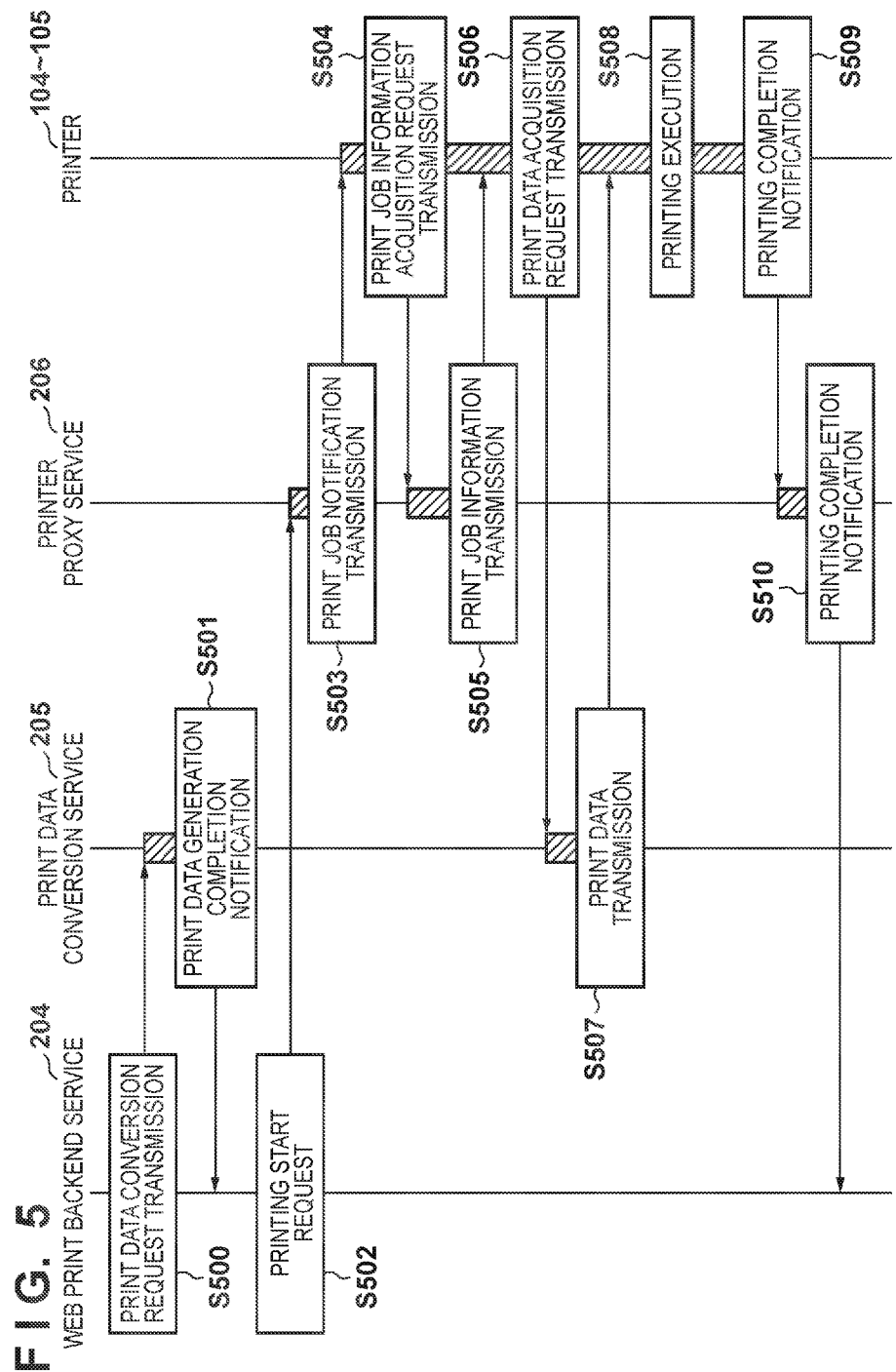
FIG. 5 is a sequence chart of a printing process according to a printer proxy service and printer communication.

Note that in FIG. 5, the printer 104 or 105 acquires the print job information from the printer proxy service 206 in steps S504 and S505, and then acquires the print data from the print data conversion service 205 in steps S506 and S507. However, the present invention is not limited to this. For example, the printer proxy service 206 having received the print job information acquisition request transmitted in step S504 can also acquire the corresponding print data from the print data conversion service 205, and transmit the print data together with the print job information to the printer 104 or 105 in step S505, thereby omitting the processes in steps S506 and S507. In this case, the printer 104 or 105 transmits no print data acquisition request to the print data conversion service 205. Alternatively, the printer proxy service 206 can also acquire the print data from the print data conversion service 205 in advance, transmit the print job notification in step S503, and transmit the print job information and print data together in step S505 in response to the print job information acquisition request from the printer 104 or 105.

Figure 6:
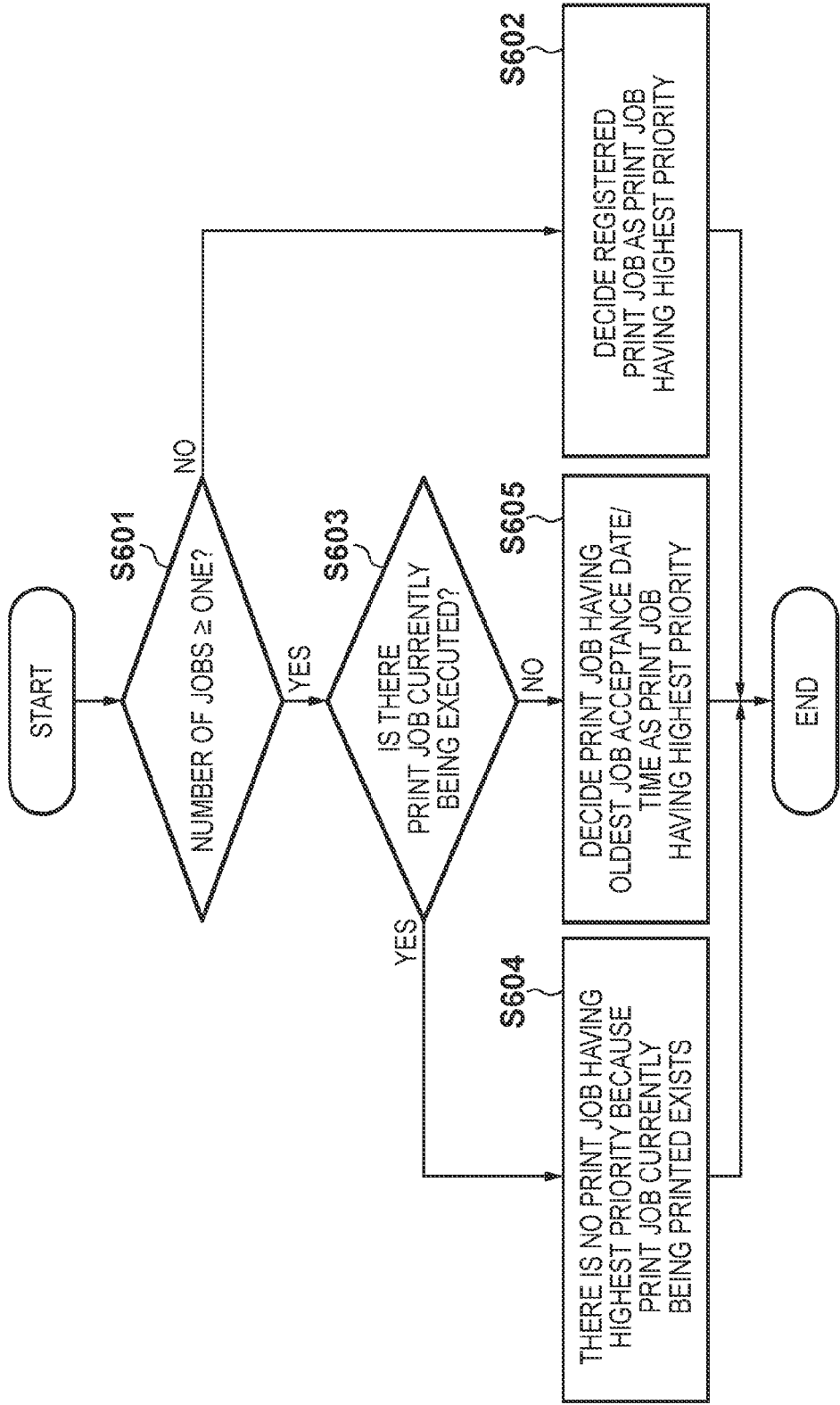
FIG. 6 is a flowchart showing a process of deciding a print job having the highest priority.
Figure 7:
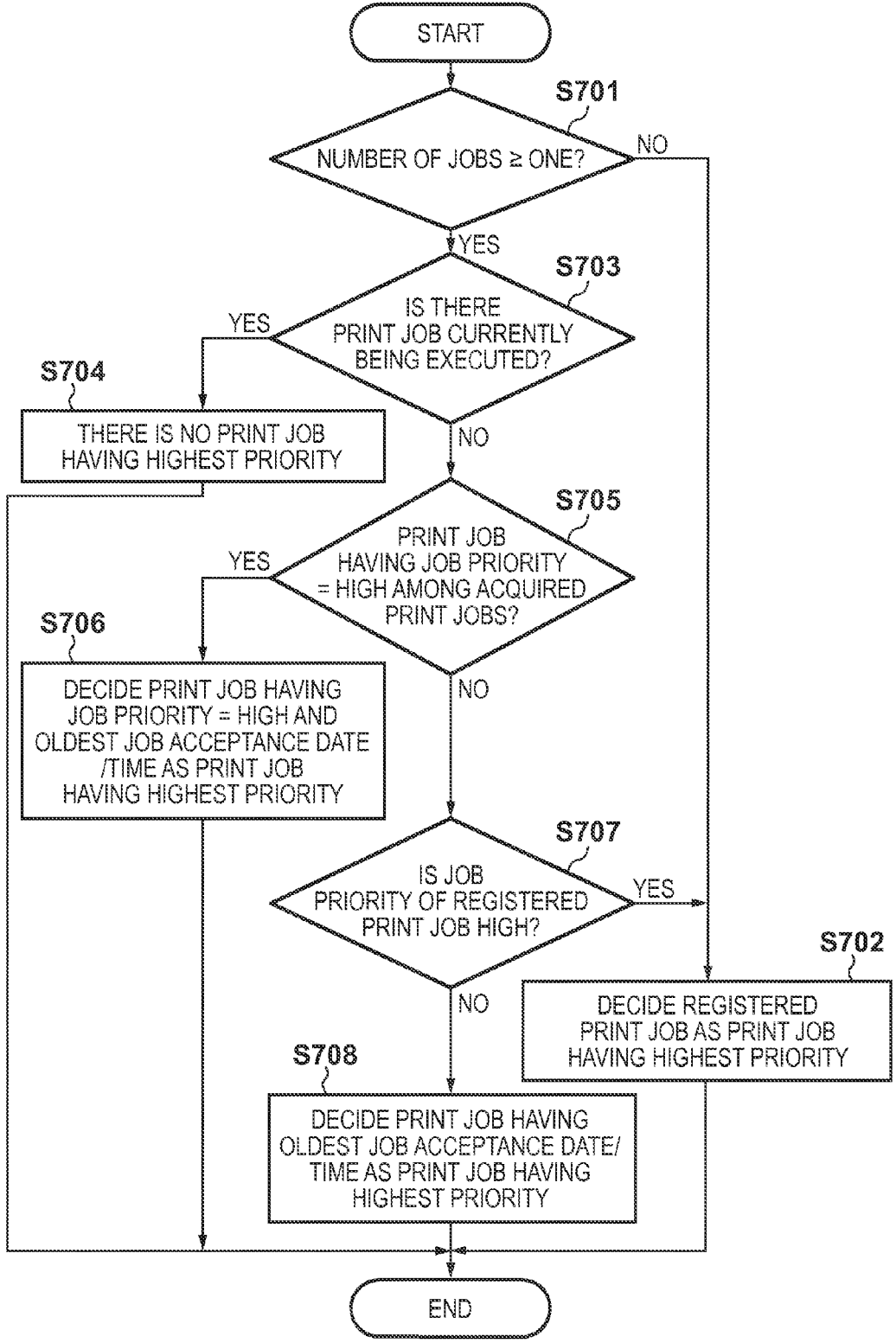
FIG. 7 is a flowchart showing a process of deciding a print job having the highest priority.

FIGS. 6 and 7 are flowcharts showing the process of deciding a print job having the highest priority, which is executed by the Web print backend service 204 in step S409 of FIG. 4. The print job search result notified from the slave job DB 202 to the Web print backend service 204 in step S408 of FIG. 4 contains or does not contain the print job registered in the master job DB 201 in step S402 of FIG. 4, in accordance with a replication delay between the master job DB 201 and slave job DB 202. In this embodiment, an arrangement for executing a process of correctly deciding a print job having the highest priority to be processed by the printer 104 or 105 even when there is no guarantee, due to this replication delay, that a print job just registered in the master job DB 201 can be obtained from the slave job DB 202 will be explained.

FIG. 6 is a flowchart showing an example of the process of deciding a print job having the highest priority from the print job information acquired from the slave job DB 202 by the Web print backend service 204 of the print system.

Figure 10:
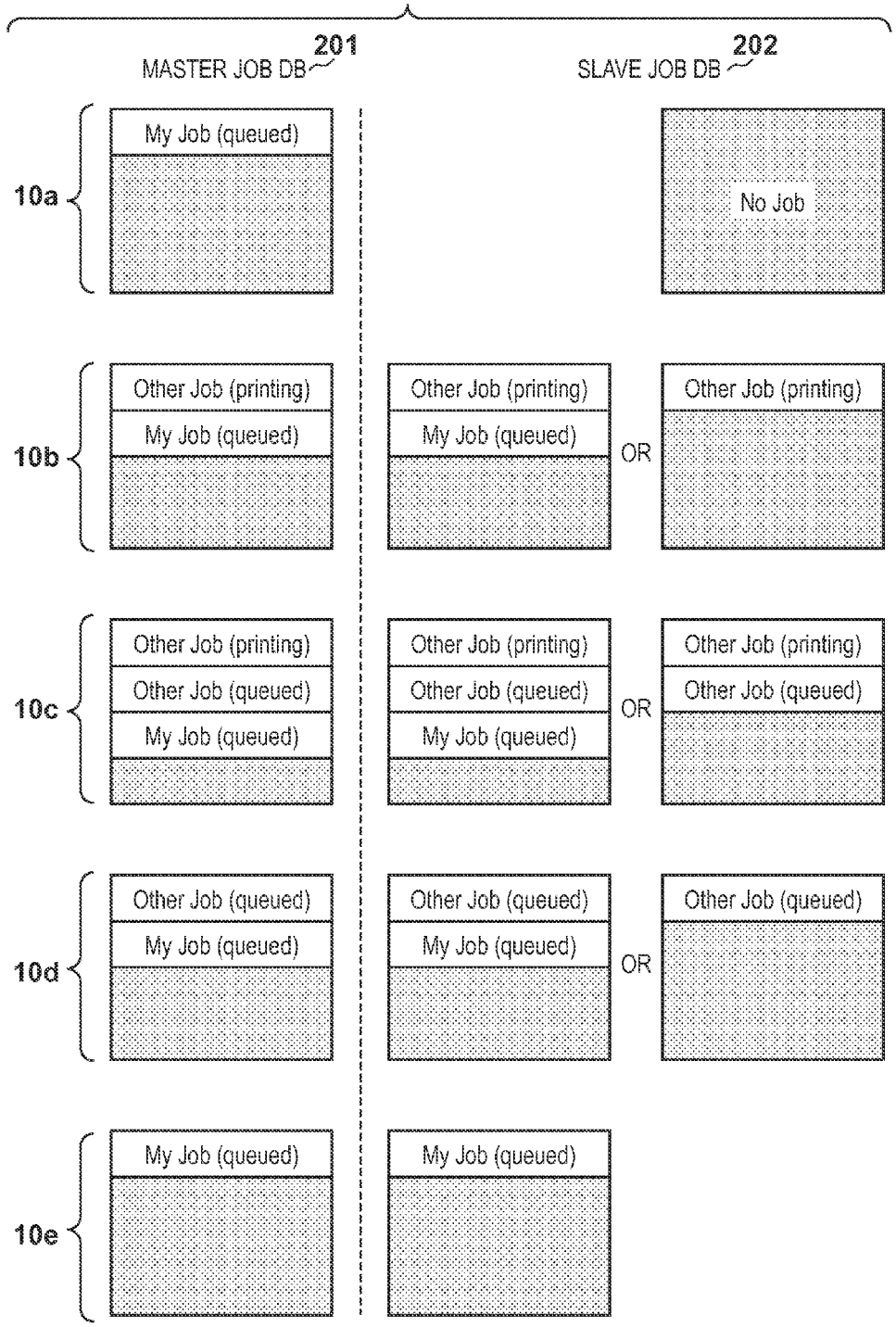
FIG. 10 is a view showing the states of job queues in the process of deciding a print job having a highest priority.

Also, FIG. 10 is a view showing the states of job queues implemented by the master job DB 201 and slave job DB 202 in each case of deciding a print job having the highest priority explained in FIG. 6. Job queue views in the left column of FIG. 10 represent the states of job queues in the master job DB 201. Job queue views in the central column of FIG. 10 represent the states of job queues when a job registered in the master job DB 201 is also registered in the slave job DB 202.

Job queue views in the right column of FIG. 10 represent the states of job queues when a job registered in the master job DB 201 has not been registered yet in the slave job DB 202 due to a replication delay.

The process to be executed by the Web print backend service 204 will now be explained with reference to FIGS. 6 and 10.

In step S601, the Web print backend service 204 having acquired the print job search result from the slave job DB 202 determines whether the number of jobs in the search result is one or more. Since the Web print backend service 204 has requested print job registration and notified print job registration completion in steps S402 and S405, at least one job is to be found from the slave job DB 202. If the number of jobs in the search result is 0 (NO in step S601), the Web print backend service 204 determines in step S602 that the print job registered in the master job DB 201 in step S402 of FIG. 4 cannot be acquired due to a replication delay. In addition, the Web print backend service 204 can determine that there is no other registered print job to be processed by the printer as a print job search target (10a in FIG. 10). Therefore, the Web print backend service 204 decides that the print job registered in step S402 is a print job having the highest priority.

In step S410 described previously, the printing process is executed on the print job having the highest priority. If no print job can be found from the slave job DB 202 as in step S602, the printing process is performed on the print job for which the Web print backend service 204 has designated registration in step S402, and which remains in the Web print backend service 204. Accordingly, if no print job can be acquired due to a replication delay as described above, the printing process can be executed on a print job without waiting until the print job is registered in the slave job DB 202 and acquired from the slave job DB 202.

On the other hand, if the number of jobs in the search result is one or more (YES in step S601), the Web print backend service 204 determines in step S603 whether a print job whose job status is "PRINTING" (executing) exists among the print jobs in the search result. If a print job whose job status is "PRINTING" exists (YES in step S603), the process advances to step S604, and the Web print backend service 204 determines that no new print job can be input because a print job currently being executed already exists in the printer as a print job search target, and decides that there is no print job to be processed with the highest priority (10b and 10c in FIG. 10).

On the other hand, if there is no print job whose job status is "PRINTING" (NO in step S603), the Web print backend service 204 decides in step S605 that a print job whose job acceptance date/time 303 is oldest among the acquired print jobs is a print job to be processed with the highest priority, without determining whether the print job registered in the master job DB 201 by the Web print backend service 204 in step S402 of FIG. 4 is contained in the search result. This is so because if the print job registered in step S402 is contained in the search result, it is possible to correctly decide that the oldest print job among other print jobs including the above-mentioned print job is a print job having the highest priority. Also, even when the print job registered in step S402 is not contained in the search result from the slave job DB 202 due to a replication delay, it is possible to determine that a print job registered in the master job DB 201 before the registration of the print job in step S402 already exists in the slave job DB 202. This makes it possible to determine that the print job in the search result has a priority higher than that of the print job registered in step S402 (10d and 10e in FIG. 10).

That is, in this embodiment, even when no registered print job is found, if there is a job having a high priority (for example, the oldest job), this job is processed. Accordingly, it is possible to prevent the interruption of the job processing caused when the above-mentioned registered print job is not found. Furthermore, while the Web print backend service 204 is processing the above-mentioned print job having the highest priority, the above-mentioned registered print job is sometimes registered in the slave job DB 202. In this case, the corresponding print job can be found without waiting for job registration to the slave job DB 202.

Note that in FIG. 6, only the job acceptance date/time 303 is used as the condition for deciding a print job having the highest priority. However, this decision may also be performed by adding another condition. For example, the user may designate a priority to a print job, and register the job in association with its priority in the DB.

FIG. 7 is a flowchart showing a process when taking account of the job priority 305 added to a print job, in addition to the job acceptance date/time 303, as the conditions for deciding a print job having the highest priority, in the process by which the Web print backend service 204 of the print system decides a print job having the highest priority from print job information acquired from the slave job DB 202.

Figure 11:
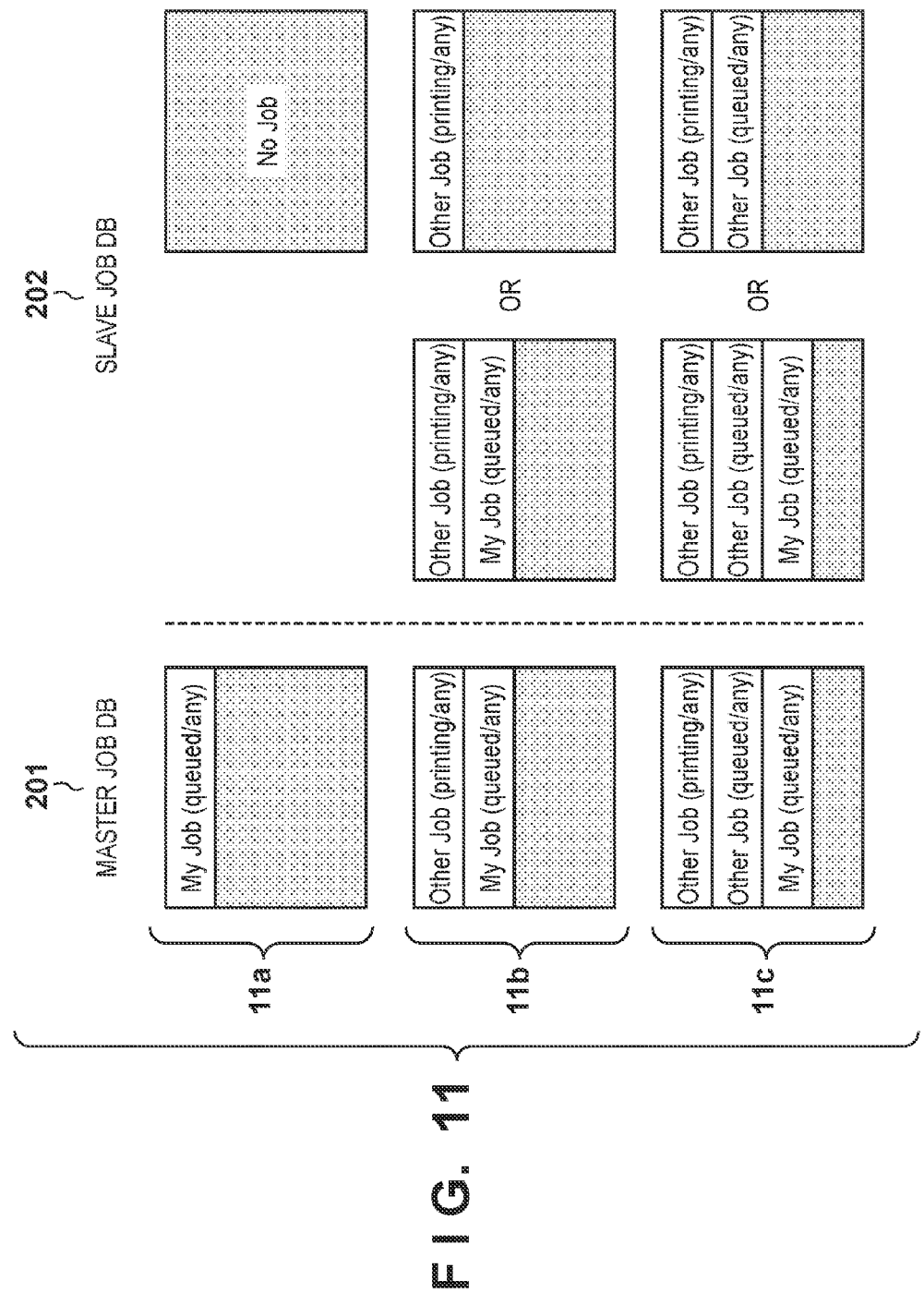
FIG. 11 is view showing the states of job queues in the process of deciding a print job having a highest priority.
Figure 12:
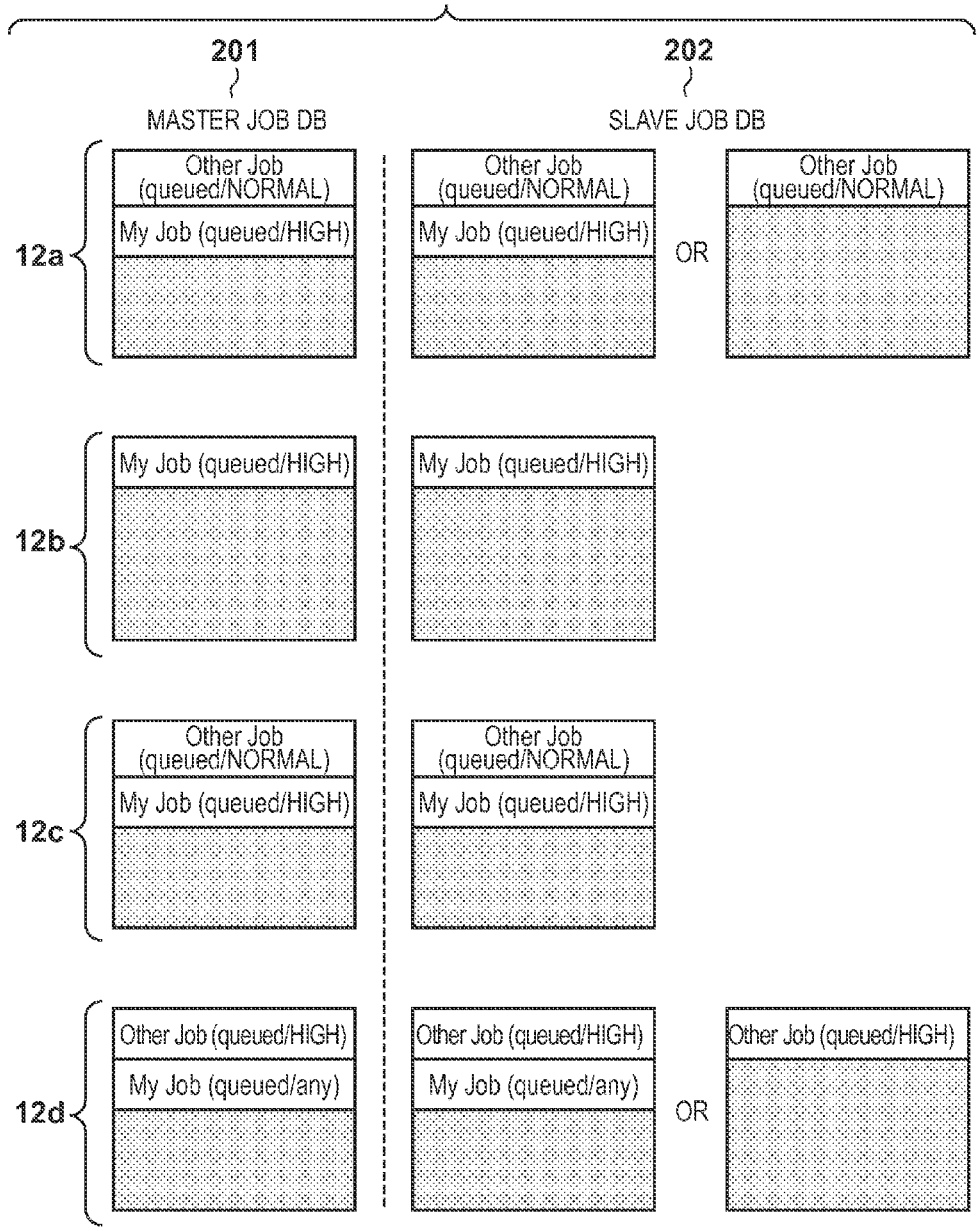
FIG. 12 is a view showing the states of job queues in the process of deciding a print job having a highest priority.
Figure 13:
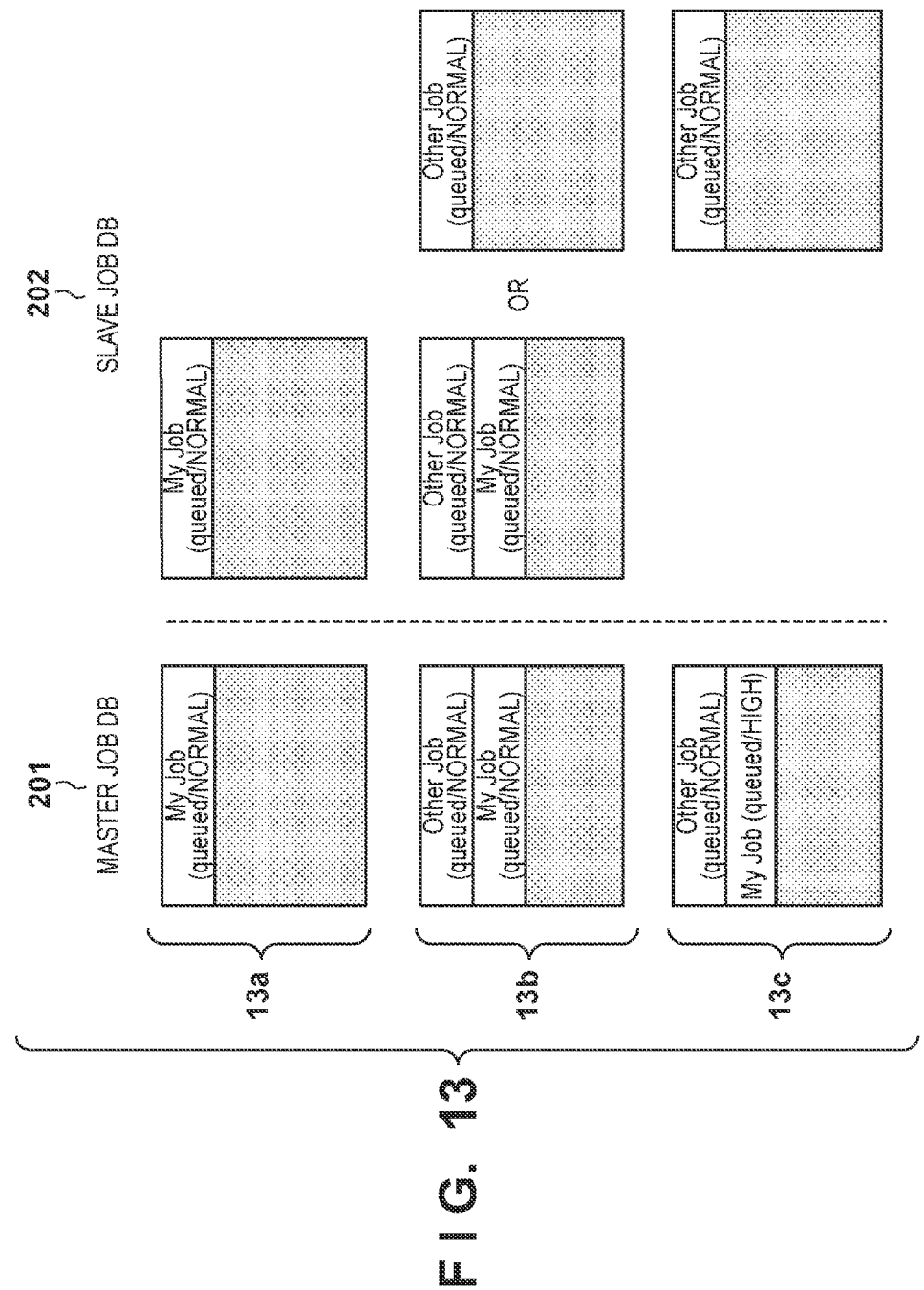
FIG. 13 is a view showing the states of job queues in the process of deciding a print job having a highest priority.

Also, FIGS. 11 to 13 are views showing the states of job queues to be implemented by the master job DB 201 and slave job DB 202 in each case in which a print job having the highest priority is decided, which is explained in FIG. 7. Job queue views in the left column of each of FIGS. 11 to 13 represent the states of job queues of the master job DB 201. Job queue views in the central column of each of FIGS. 11 to 13 represent the states of job queues when a job registered in the master job DB 201 is registered in the slave job DB 202 as well. Job queue views in the right column of each of FIGS. 11 to 13 represent the states of job queues when a job registered in the master job DB 201 has not been registered yet in the slave job DB 202 due to a replication delay.

The process to be executed by the Web print backend service 204 will be explained below with reference to FIGS. 7 and 11 to 13.

In step S701, the Web print backend service 204 having acquired the print job search result from the slave job DB 202 determines whether the number of jobs in the search result is one or more. If the number of jobs in the search result is 0 (NO in step S701), the Web print backend service 204 determines in step S702 that the print job registered in the master job DB 201 in step S402 of FIG. 4 cannot be acquired due to a replication delay. Also, the Web print backend service 204 can determine that there is no other registered print job to be processed by the printer as a print job search target (11a in FIG. 11), and hence decides that the print job registered in step S402 is a print job to be processed with the highest priority. 11a in FIG. 11 represents the states of job queues in the master job DB 201 and slave job DB 202 in a case in which the print job to be processed with the highest priority is decided in step S702.

On the other hand, if the number of jobs in the search result is one or more (YES in step S701), the Web print backend service 204 determines in step S703 whether a print job whose job status is "PRINTING" (executing) exists among the print jobs in the search result. If a print job whose job status is "PRINTING" exists (YES in step S703), the process advances to step S704, and the Web print backend service 204 determines that no new print job can be input because a print job currently being executed already exists in the printer as a print job search target, and decides that there is no print job to be processed with the highest priority (11b and 11c in FIG.

11). 11*b* and 11*c* in FIG. 11 represent the states of job queues in the master job DB 201 and slave job DB 202 in a case in which it is determined in step S704 that there is no print job to be processed with the highest priority.

On the other hand, if there is no print job whose job status is "PRINTING" (NO in step S703), the Web print backend service 204 determines in step S705 whether a print job whose job priority 305 is "HIGH" exists among the print jobs in the search result acquired from the slave job DB 202.

If a print job whose job priority 305 is HIGH exists among the print jobs in the search result acquired from the slave job DB 202 (YES in step S705), the process advances to step S706, and the Web print backend service 204 decides that a print job whose job priority 305 is HIGH and job acceptance date/time 303 is oldest among the acquired print jobs (a plurality of print jobs) is a print job to be processed with the highest priority, without determining whether the print job registered in step S402 of FIG. 4 is contained in the search result. This is so because if the print job registered in step S402 is contained in the search result, it is possible to correctly decide that a print job whose job priority 305 is HIGH and which is oldest among other print jobs including the above-mentioned print job is a print job having the highest priority. Also, even when the job priority 305 of the print job registered in step S402 is HIGH and this print job is not contained in the search result from the slave job DB 202 due to a replication delay, it is possible to determine that a print job registered in the master job DB 201 before the registration of the print job in step S402 and whose job priority 305 is HIGH already exists in the slave job DB 202 (12*a* to 12*d* in FIG. 12). 12*a* to 12*d* in FIG. 12 represent the states of job queues in the master job DB 201 and slave job DB 202 in a case in which a print job to be processed with the highest priority is decided in step S706.

On the other hand, if no print job whose job priority 305 is HIGH exists among the print jobs in the search result acquired from the slave job DB 202 (NO in step S705), the Web print backend service 204 determines in step S707 whether the job priority 305 of the print job registered in step S402 is HIGH.

If the job priority 305 of the print job registered in step S402 is not HIGH (NO in step S707), the Web print backend service 204 decides in step S708 that a print job whose job acceptance date/time 303 is oldest among the print jobs acquired from the slave job DB 202 is a print job having the highest priority (13*a* and 13*b* in FIG. 13). 13*a* and 13*b* in FIG. 13 represent the states of job queues in the master job DB 201 and slave job DB 202 in a case in which a print job to be processed with the highest priority is decides in step S708.

On the other hand, if the job priority 305 of the print job registered in step S402 is HIGH (YES in step S707), the Web print backend service 204 determines in step S702 that the job priority 305 of the print job registered in step S402 of FIG. 4 is HIGH and this print job cannot be acquired due to a replication delay. In addition, the Web print backend service 204 decides that the print job registered in step S402 is a print job to be processed with the highest priority because the job priority 305 of each of all other print jobs to be processed by the printer as a print job search target is not HIGH (13*c* in FIG. 13). 13*c* in FIG. 13 represents the states of job queues in the master job DB 201 and slave job DB 202 in a case in which a print job to be processed with the highest priority is decides in step S702.

Note that if the Web print backend service 204 decides in step S702 of FIG. 7 that the registered print job is a print job to be processed with the highest priority, this is the same as the case in step S602 of FIG. 6 described earlier. That is, in step S410, the printing process is performed on a print job for which registration designation is performed in step S402 by the Web print backend service 204 and which remains in the Web print backend service 204.

In the first embodiment as has been explained above, in the print system which implements print job queues by the DBs having the asynchronous replication configuration, even when a print job just registered in the master DB cannot be acquired from the slave DB due to the delay time of replication, it is possible to decide a print job having the highest priority to be executed by a printer and transmit the print job to the printer without increasing access to the master DB.

Also, in this case, the printing process is performed on a print job for which registration designation is performed in step S402 by the Web print backend service 204 and which remains in the Web print backend service 204. Therefore, the printing process can be executed on a print job without waiting until the print job is registered in the slave job DB 202 and acquired from the slave job DB 202.

Second Embodiment

In the first embodiment, the method of correctly deciding a job having the highest priority even when a print job received from the client terminal cannot be acquired from the slave job DB 202 immediately after the print job is registered in the master job DB 201 in the print job management service of the print system has been explained.

In the second embodiment, a method of correctly deciding a print job having the highest priority and transmitting the job to a printer when the update contents of a canceled print job cannot be acquired from a slave job DB 202 immediately after the print job is canceled will be explained.

Figure 8:
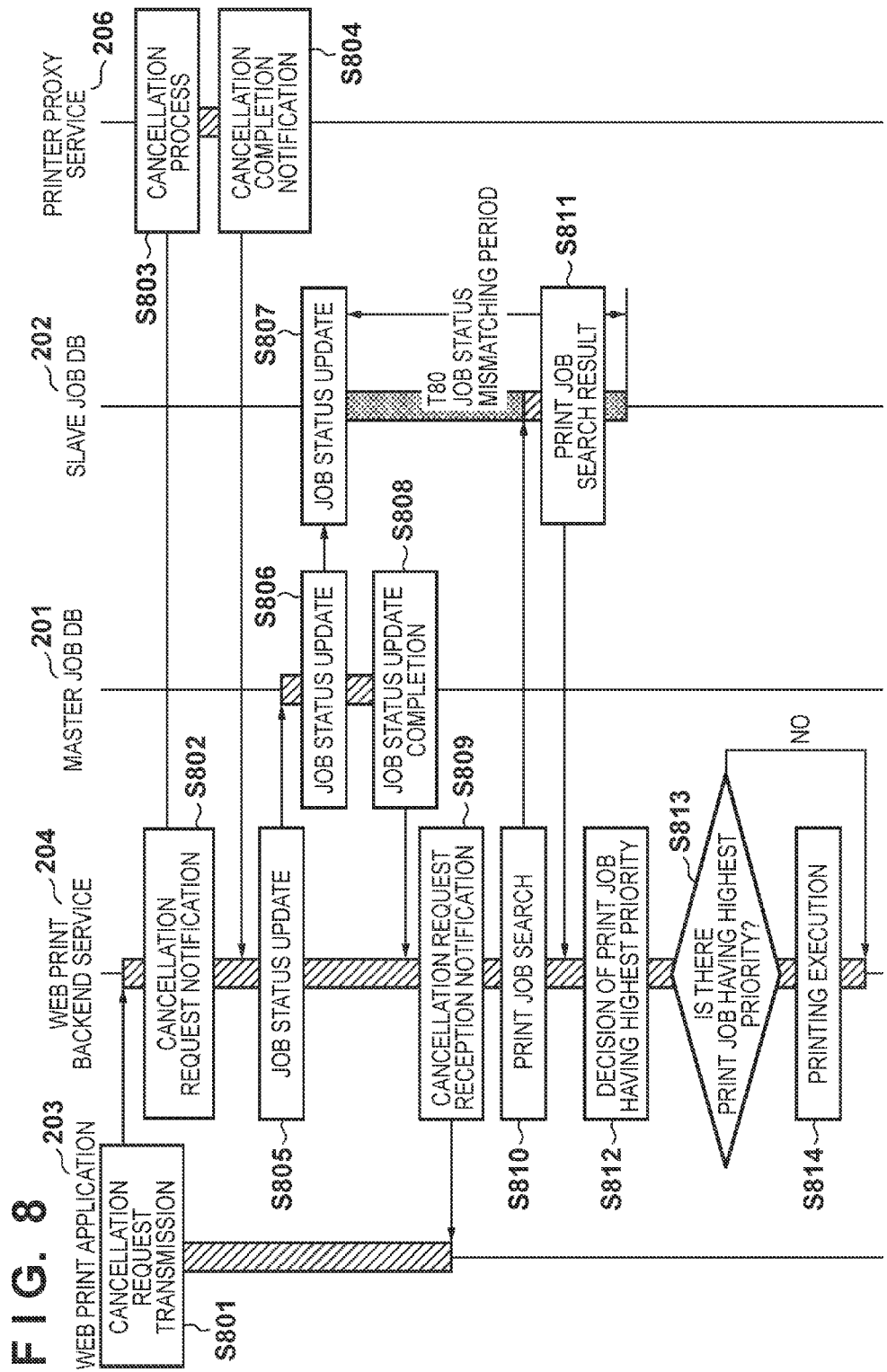
FIG. 8 is a sequence flowchart showing a job canceling process in the print system.

FIG. 8 is a sequence chart showing a print job canceling process in a print system.

In step S801, a Web print application 203 having accepted a print job cancellation request from a client terminal 103 transmits the print job cancellation request to a Web print backend service 204.

In step S802, the Web print backend service 204 transmits the print job cancellation request to a printer proxy service 206.

In step S803, the printer proxy service 206 executes a canceling process, for example, notifies a printer 104 or 105, which is executing a print job as a target of the cancellation request received in step S802, of the cancellation of the print job. In step S804, the printer proxy service 206 transmits a cancellation completion notification to the Web print backend service 204. Note that the processes in steps S802 to S5804 are necessary only when the cancellation target print job is already input to the printer 104 or 105. Therefore, if the cancellation target print job is not input to the printer 104 or 105, the process advances to step S805 without performing these processes.

In step S805, the Web print backend service 204 updates the job status of the cancellation target print job registered in a master job DB 201 to "CANCELED".

In step S806, the master job DB 201 notifies the updated job status of the print job as DB update contents to the slave job DB 202. The master job DB 201 notifies the Web print backend service 204 of the completion of job status update in step S808 without waiting until the slave job DB 202 completes the update of the job status of the cancellation target print job. When the Web print backend service 204 performs print job search, therefore, the cancellation target print job may be found because the cancellation of the print job in the slave job DB 202 is delayed.

In step S807, the slave job DB 202 having received the data update contents from the master job DB 201 in step S806 reflects the job status update contents on data held in the slave job DB 202. A job status mismatching period T80 until the reflection of the update contents is complete is a period during which the job status of the cancellation target print job acquired from the slave job DB 202 is not updated to "CANCELED", and does not match the job status of the same print job acquired from the master job DB 201.

In step S809, the Web print backend service 204 transmits a cancellation request reception notification to the Web print application 203. Subsequently, in step S810, the Web print backend service 204 transmits a job search request to the slave job DB 202 in order to search for all print jobs for the printer which executes the print job as a target of the cancellation request received in step S801.

In step S811, the slave job DB 202 having received the job search request from the Web print backend service 204 searches its own database for all print jobs for the designated printer, and returns the print job search result to the Web print backend service 204.

If step S811 is performed in the job status mismatching period T80, the print job whose job status is updated to "CANCELED" in step S805 is not updated to "CANCELED" in the slave job DB 202, and is contained in the search result as, for example, a print job whose job status is "PRINTING" representing "executing" or "QUEUED" representing a state in which the print job is not input to the printer. If in this state the Web print backend service 204 decides a print job having the highest priority in accordance with the flowcharts shown in FIGS. 6 and 7 in step S812, the Web print backend service 204 may determine that there is no print job having the highest priority because a job currently being executed exists, or may decide by mistake that a canceled print job as a print job having the highest priority and input the print job to the printer.

In the second embodiment, therefore, a process of correctly deciding a print job having the highest priority even in a case in which a canceled print job having a correct job status cannot be acquired from the slave job DB 202 will be explained.

Figure 9:
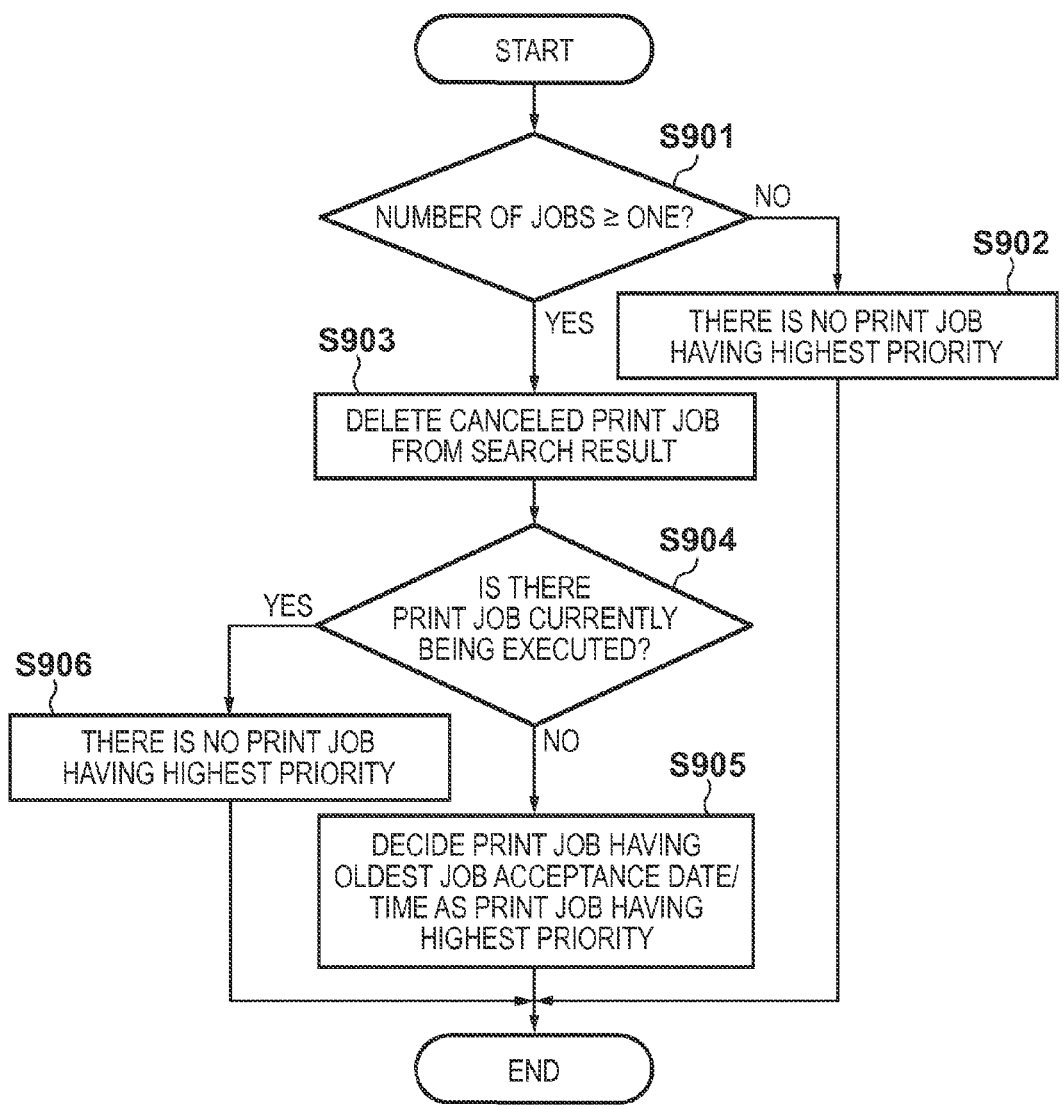
FIG. 9 is a flowchart showing a process of deciding a print job having the highest priority.

FIG. 9 is a flowchart showing the process of deciding a print job having the highest priority, which is executed by the Web print backend service 204 in step S812 of FIG. 8.

In step S901, the Web print backend service 204 having acquired the print job search result from the slave job DB 202 determines whether the number of jobs in the search result is one or more. If the number of jobs in the search result is 0 (NO in step S901), the Web print backend service 204 determines in step S902 that there is no print job to be processed with the highest priority. This is so because it is possible to determine that there is no print job which cannot be acquired due to a replication delay as in step S602 of FIG. 6 of the first embodiment, because the print job search in step S810 of FIG. 8 is executed immediately after the print job is canceled.

On the other hand, if the number of jobs in the search result is one or more (YES in step S901), the process advances to step S903, and, if a print job whose job status is updated to "CANCELED" with respect to the master job DB in step S805 of FIG. 8 exists in the search result, the Web print backend service 204 deletes (excludes) this print job from the search result. This makes it possible to prevent the print job canceled as described above from being printed or transmitted to the printer.

In step S904, the Web print backend service 204 determines whether a print job whose job status is "PRINTING" exists in the print jobs of the search result. If a print job whose job status is "PRINTING" exists in step S904 (YES in step S904), the process advances to step S906, and the Web print backend service 204 determines that no new print job can be input to the printer as a print job search target because a print job currently being executed exists in the printer, and decides that there is no print job to be processed with the highest priority.

On the other hand, if no print job whose job status is "PRINTING" exists (NO in step S904), the Web print backend service 204 decides in step S905 that a print job whose job acceptance date/time 303 is oldest among the acquired print jobs is a print job to be processed with the highest priority.

Figure 14:
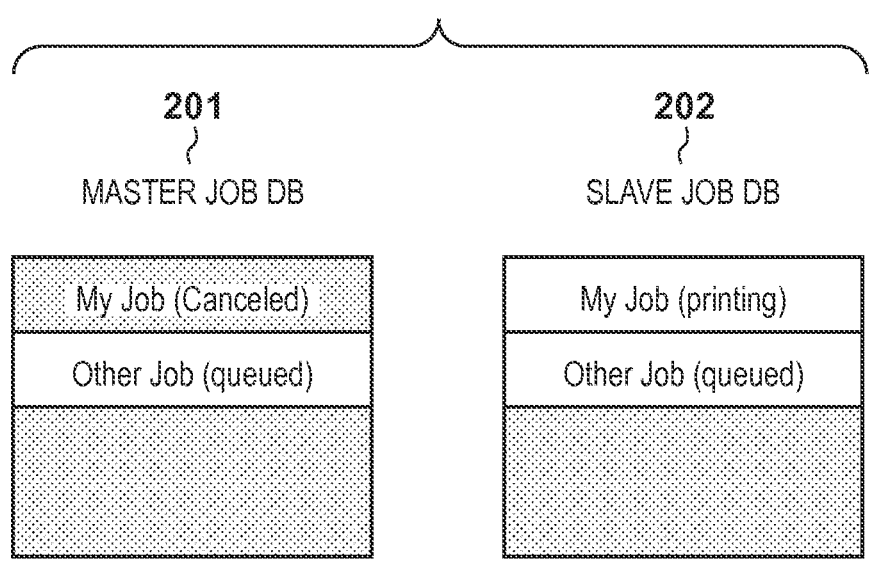
FIG. 14 is a view showing the states of job queues in the process of deciding a print job having a highest priority.

As described above, a canceled print job is deleted from search targets in advance in step S903. Therefore, even when a print job whose job status is updated to "CANCELED" with respect to the master job DB 201 in step S805 is not completely updated in the slave job DB 202 and acquired as a print job whose job status is "PRINTING", it is possible to protect the determination in step S904 from being influenced. FIG. 14 shows the states of job queues in the master job DB 201 and slave job DB 202 when the above-described case occurs. Also, even when a print job whose job status is updated to "CANCELED" with respect to the master job DB 201 in step S805 is a print job whose job acceptance date/time 303 is oldest in the search result, it is possible to prevent this print job from being decided as a print job to be processed with the highest priority in step S905.

In the second embodiment as explained above, in addition to the effects explained in the first embodiment, a print job having the highest priority can correctly be decided even when the update contents of a canceled print job cannot be acquired from the slave job DB 202 immediately after the print job is canceled.

Third Embodiment

The first and second embodiments have been explained by taking the print job management service of the print system in the cloud print service as an example, but the present invention is not limited to this. For example, the present invention is also applicable to job management when a client terminal issues an execution request for a job of another service such as facsimile or scan in an external device such as a printing device. Also, processing for a job can be various kinds of processing such as downloading of various kinds of data such as images and texts, and data transmission (for example, mail transmission) from a server to an apparatus different from the client terminal.

In the above-mentioned embodiments, an example in which the number of jobs found from the slave job DB 202 is determined and a job to be processed is decided in accordance with the number has been explained. However, the present invention is not limited to this, and it is also possible to determine whether a job having undergone the registration process is contained. In this case, if the job having undergone the registration process is not contained in the search result, a predetermined process such as a printing process or transmission process can be performed on the job of the Web print backend service regardless of the number of other jobs.

Furthermore, in the above embodiments, an example in which the server 101 operates as an information processing apparatus according to this embodiment has been disclosed. However, the present invention is not limited to this. For example, a plurality of servers may also execute processing of the embodiments as described earlier. Also, an example in which the server 101 includes various databases for registering jobs has been explained, but the present invention is not limited to this. That is, the server 101 as an information processing apparatus may also register jobs in the master database and slave database separated from the server 101. In this case, the master database and slave database can operate as the same apparatus or different apparatuses.

Furthermore, if a job registered in the master job DB 201 by the Web print backend service cannot be found from the slave job DB 202, the Web print backend service may perform a printing process on a job of the Web print backend service, or on a job registered in the master job DB 201.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167847, filed Aug. 12, 2013, which is hereby incorporated by reference herein in its entirety.

What is claimed is:

1. An information processing system comprising one or more apparatuses which manage job information of a job, comprising:
the one or more apparatuses which manage a job by registering job information corresponding to the job in a first database, wherein the job information is further asynchronously registered in a second database; and,
an external device which executes the job managed by said one or more apparatuses,
wherein in a case where receiving an execution request for a job to be executed by said external device, said one or more apparatuses register job information of the job in said first database and search said second database for job information for said external device, and,
wherein if job information is not found by the search, said one or more apparatuses execute predetermined processing based on the job information registered by said one or more apparatuses, and,
wherein if job information is found by the search, said one or more apparatuses execute the predetermined processing based on the job information, regardless of whether the job information corresponds to the registered job information.

2. The system according to claim 1, wherein
if job information is not found by the search, said one or more apparatuses executes the predetermined processing based on the job information held by said one or more apparatuses as the job information registered by said one or more apparatuses.

3. The system according to claim 1, wherein if job information corresponding to a plurality of jobs is found by the search, said one or more apparatuses executes the predetermined processing on a job based on date/time information contained in the job information, among the plurality of jobs.

4. The system according to claim 1, wherein if said search unit finds job information corresponding to a plurality of jobs is found by said search, said one or more apparatuses execute the predetermined processing on a job based on a priority contained in the job information, among the plurality of jobs.

5. The system according to claim 1, wherein said one or more apparatuses execute the predetermined processing on the job, based on the job information registered in said first database as the job information registered by said one or more apparatuses.

6. The system according to claim 1, wherein
said external device is a printing device,
the one or more apparatuses manage a job including a location information indicating a location of data to be printed by the printing device, and
said one or more apparatuses execute transmission of the location information to the printing device, as the predetermined processing.

7. The system according to claim 1, wherein
said one or more apparatuses are one or more web servers.

8. An information processing system comprising one or more apparatuses which manage job information of a job, comprising:
the one or more apparatuses which manage a job by registering job information corresponding to the job in a first database, wherein the job information is further asynchronously registered in a second database; and
an external device which executes the job managed by said one or more apparatuses,
wherein in a case where receiving an execution request for a job to be executed by said external device, said one or more apparatuses register job information of the job in said first database and search said second database for job information for said external device, and,
wherein if job information is not found by the search, said one or more apparatuses execute predetermined processing based on the job information registered by said one or more apparatuses, and,
wherein if job information corresponding to a plurality of jobs is found by the search, said one or more apparatuses execute the predetermined processing on a job indicated by job information containing oldest date/time information, among the plurality of jobs.

9. The system according to claim 8, wherein
said external device is a printing device,
the one or more apparatuses manage a job including a location information indicating a location of data to be printed by the printing device, and
said one or more apparatuses execute transmission of the location information to the printing device, as the predetermined processing.

10. The system according to claim 8, wherein
said one or more apparatuses are one or more web servers.

11. An information processing system comprising one or more apparatuses which manage job information of a job, comprising:

the one or more apparatuses which manage a job by registering job information corresponding to the job in a first database, wherein the job information is further asynchronously registered in a second database; and an external device which executes the job managed by said one or more apparatuses, wherein in a case where receiving an execution request for a job to be executed by said external device, said one or more apparatuses register job information of the job in said first database and search said second database for job information for said external device, and wherein said one or more apparatuses request, in a case where receiving a cancellation request for a job to be executed by said external device, said second database to update a status of job information registered in said second database as a cancellation target of the cancellation request, and wherein in a case where said one or more apparatuses search for job information in accordance with the request for update of the status of the job information, if the update is not reflected on the job information, said one or more apparatuses perform control such that predetermined processing is not executed on a job corresponding to the job information.

12. The system according to claim 11, wherein
said external device is a printing device,
the one or more apparatuses manage a job including a location information indicating a location of data to be printed by the printing device, and
said one or more apparatuses execute transmission of the location information to the printing device, as the predetermined processing.

13. The system according to claim 11, wherein
said one or more apparatuses are one or more web servers.

14. An information processing method which manages a job to be executed by an external device by registering job information corresponding to the job in a first database, and further asynchronously registering the job information in a second database, comprising:
a registration step of registering, in a case where receiving an execution request for a job to be executed by the external device, job information of the job in the first database; and
a search step of searching the second database for job information for the external device;
wherein if job information is not found in the search step, predetermined processing is executed based on the job information registered in the registration step, and
wherein if job information is found in the search step, the predetermined processing is executed based on the job information, regardless of whether the job information corresponds to the registered job information.

15. The method according to claim 14, wherein
one or more apparatus execute the registering in the registration step, the search in the search step, and the predetermined processing, and
wherein if job information is not found in the search step, the predetermined processing is executed based on the job information held by said one or more apparatuses as the job information registered in the registration step.

16. The method according to claim 14, wherein if job information corresponding to a plurality of jobs is found in the search step, the predetermined processing is executed on a job based on date/time information contained in the job information, among the plurality of jobs.

17. The method according to claim 14, wherein if job information corresponding to a plurality of jobs is found in the search step, the predetermined processing is executed on a job based on a priority contained in the job information, among the plurality of jobs.

18. The method according to claim 14, wherein the predetermined processing is executed on a job corresponding to the job information, based on the job information registered in the first database as the job information registered in the registration step.

19. The method according to claim 14, wherein
the external device is a printing device, and
processing by which the printing device performs printing based on a job is executed as the predetermined processing.

20. An information processing method which manages a job to be executed by an external device by registering job information corresponding to the job in a first database, and further asynchronously registering the job information in a second database, comprising:
a registration step of registering, in a case where receiving an execution request for a job to be executed by the external device, job information of the job in the first database; and
a search step of searching the second database for job information for the external device,
wherein if the job information is not found by said search, predetermined processing is executed based on the job information registered by said registration step, and
wherein if job information corresponding to a plurality of jobs is found in the search step, the predetermined processing is executed on a job indicated by job information containing oldest date/time information, among the plurality of jobs found in the search step.

21. The method according to claim 20, wherein
the external device is a printing device, and
processing by which the printing device performs printing based on a job is executed as the predetermined processing.

22. An information processing method which manages a job to be executed by an external device by registering job information corresponding to the job in a first database, and further asynchronously registering the job information in a second database, comprising:
a registration step of registering, in a case where receiving an execution request for a job to be executed by the external device, job information of the job in the first database; and
a search step of searching the second database for job information for the external device which executes the job,
wherein if job information is not found by said search, predetermined processing is executed on a job based on the job information registered in the registration step, and wherein in a case where receiving a cancellation request for a job to be executed by the external device, the second database is requested to update a status of job information registered in the second database as a cancellation target of the cancellation request, and
wherein in a case where job information is searched for in the search step in accordance with the request for update of the status of the job information and the update is not reflected on the job information, control is performed such that predetermined processing is not executed on a job corresponding to the job information.

23. The method according to claim 22, wherein
the external device is a printing device, and
processing by which the printing device performs printing based on a job is executed as the predetermined processing.

* * * * *